United States Patent [19]

Seilly

[11] 4,350,954
[45] Sep. 21, 1982

[54] INDUCTIVE TYPE DISPLACEMENT TRANSDUCERS

[75] Inventor: Alec H. Seilly, North Wembley, England

[73] Assignee: Lucas Industries Limited, Birmingham, England

[21] Appl. No.: 75,194

[22] Filed: Sep. 12, 1979

[30] Foreign Application Priority Data

Sep. 28, 1978 [GB] United Kingdom ............... 38586/78

[51] Int. Cl.³ .................. H01F 21/06; G01B 7/14; G01R 33/00
[52] U.S. Cl. .................................. 324/208; 324/236; 331/65; 336/130
[58] Field of Search .................. 324/208, 236, 207; 331/65; 336/180, 186–188, 220, 222, 225, 170, 171, 181, 30, 130, 136; 334/74, 75

[56] References Cited

U.S. PATENT DOCUMENTS

| | | | |
|---|---|---|---|
| 2,178,653 | 11/1939 | Slade | 336/188 X |
| 2,322,722 | 6/1943 | Wentworth | 336/136 |
| 2,368,857 | 2/1945 | McClellan | 336/188 X |
| 2,471,777 | 5/1949 | Reinartz | 336/181 X |
| 2,550,736 | 5/1951 | Tricebock | 336/181 X |
| 2,769,969 | 11/1956 | Comstock | 336/30 X |
| 2,942,212 | 6/1960 | Mynall | 336/225 X |
| 3,521,159 | 7/1970 | Morrow | 324/236 X |
| 3,639,860 | 2/1972 | Breitenbach | 336/180 X |
| 3,735,244 | 5/1973 | Gumtau et al. | 324/208 X |
| 3,891,918 | 6/1975 | Ellis | 324/236 X |
| 4,085,394 | 4/1978 | Weisenberger | 331/65 X |
| 4,091,671 | 5/1978 | McLees | 331/65 X |
| 4,195,260 | 3/1980 | Sakamoto et al. | 324/236 |

Primary Examiner—Gerard R. Strecker

[57] ABSTRACT

A displacement transducer includes a non-magnetic non-conductive former mounting helical bifilar windings. Slidable within the former is a conductive non-magnetic member the position of which is varied for the purpose of measuring displacement. The windings in use form the frequency determining component of an oscillator the frequency of which is a measure of the setting of the member.

4 Claims, 2 Drawing Figures

INDUCTIVE TYPE DISPLACEMENT TRANSDUCERS

This invention relates to displacement transducers of the inductive type.

Known forms of such transducer comprise a coil of wire in which the direction of current flow at any instant is the same in each turn of the coil and a core member formed from magnetisable material and which can be moved axially into the coil so as to vary the inductance of the coil.

The inductance measurement provides a indication of the position of the core within the coil and hence an indication of the displacement. A disadvantage of such an arrangement derives from the hysterisis effect of the material from which the core member is constructed. This reduces the accuracy of the measurement of the inductance value and also limits the frequency of the alternating current supply to which the coil is connected for the purpose of the measurement.

The object of the invention is to provide a displacement transducer in a simple and convenient form.

According to the invention, a displacement transducer comprises a former of non-magnetic and non-conductive material, winding means carried on said former, a core member slidable within said former, said core member in use being connected to or forming part of a member the displacement of which is to be measured, said core member being formed from electrically conductive non-magnetisable material and said winding means comprising first and second interengaged helical windings having the same number of turns and interconnected such that the current flow in one winding is opposite to that in the other winding, said windings in use being supplied with alternating current such that eddy currents are induced in the portion of the core member which lies within the former, the inductance of the winding means being dependent due to the eddy currents, on the position of the core member within the former.

One example of a displacement transducer in accordance with the invention will now be described with reference to the accompanying drawings in which.

Figure 1:
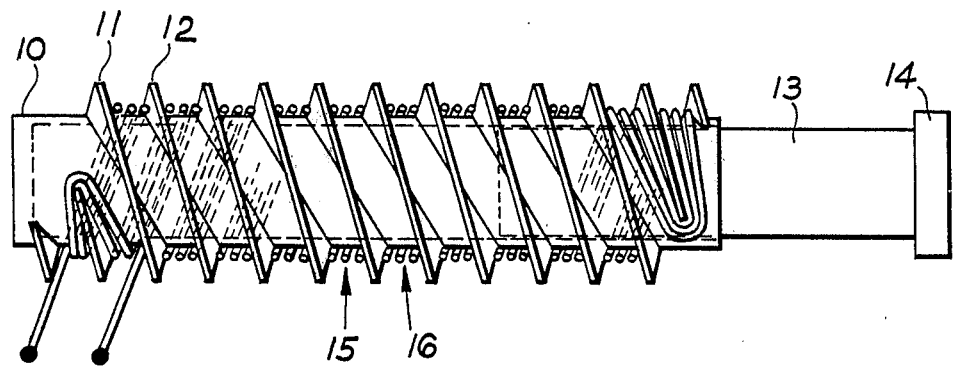
FIG. 1 is a side elevation of the transducer.

The transducer comprises a former 10 formed from plastics or like non-conductive and non-magnetizable material and on which is formed or mounted a pair of helical ribs 11, 12 which can be regarded as forming the equivalent of a two start screw thread.

The former 10 is provided with a bore in which is slidable a member 13 having a cylindrical outer surface. The member 13 may be solid or of hollow form but is formed from an electrically conductive non-magnetic material such for example as copper or aluminium. The member 13 is provided with a head 14 whereby in use, the member can be secured to another member, the displacement of which is to be measured.

Located between the ribs 11 and 12 are a pair of windings 15, 16 each winding in the particular example shown, having three conductors. Conveniently the windings are formed from a continuous length of wire wound along one of the grooves defined between adjacent ribs 11 and 12 and returning to the same end of the former along the other groove. This process would be carried out three times.

With the member 13 removed from the former the self-inductance of the windings is very small because they are wound in bifilar fashion. However, when the member 13 is inserted into the former and a high frequency alternating current passed through the windings, eddy currents flow in the surface of the member 13 and the eddy currents oppose the change in current in the windings 15 and 16 so that the latter do exhibit inductance. The inductance value depends upon the amount by which the member 13 extends within the former and as the penetration increases so also does the inductance value.

The transducer as described can be operated at frequencies in the order of 2 MHz and the response is extremely fast. Moreover, the hysterisis effect is negligible and the linearity is extremely high being less than one percent over the full travel.

In a practical example the wall thickness of the former was 0.5 mm with the diameter of the member 13 being 4.0 mm and the length of the winding 25.0 mm. In this example moreover, each winding had five turns.

A transducer can be made of any desired length to accommodate the travel of the member to which the member 13 is connected.

Figure 2:
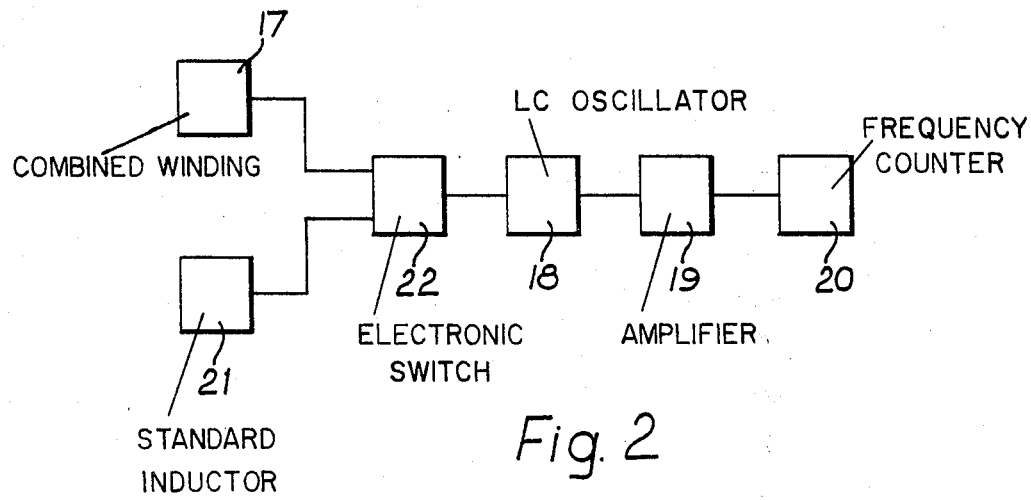
FIG. 2 is a block diagram of an oscillator and amplifier for use with the transducer.

As shown in FIG. 2 the combined winding 17 of the transducer forms the frequency control component of an LC oscillator 18 and the frequency of operation of the oscillator will vary as the member is moved within the former. The output of the oscillator is connected to an amplifier 19 and the output of the amplifier is utilised to supply a frequency counter 20 which may be calibrated to give a direct indication of the displacement.

If temperature variation proves to vary the inductance to the extent that the calibration is upset, a standard inductor 21 subject to the same temperature variation can be switched into the oscillator circuit for the purpose of recalibration, by means of an electronic switch 22.

I claim:

1. A displacement transducer comprising a former of non-magnetic and non-conductive material, winding means carried on said former, a core member slidable within said former, said core member in use being connected to or forming part of a member the displacement of which is to be measured, said core member being formed from electrically conductive non-magnetisable material and said winding means comprising first and second interengaged helical windings each having at least three conductors with the conductors in side by side relationship and interconnected such that the current flow in one winding is opposite to that in the other winding, said windings in use forming the frequency control component of an oscillator and having alternating current flowing therein, said alternating current including eddy currents in the portion of the core member which lies within the former, the inductance of the winding means and frequency of the oscillator being dependent due to the eddy currents, on the position of the core member within the former.

2. A displacement transducer according to claim 1 in which the winding means forms the frequency control component of an oscillator, the frequency of oscillation of the oscillator being representative of the setting of said member.

3. A displacement transducer according to claim 2 including a standard inductor and switch means operable to connect the standard inductor to the oscillator for the purpose of calibration.

4. A displacement transducer according to claim 1 in which said core member is formed from copper or aluminium.

* * * * *